United States Patent [19]
Via

[11] 4,032,845
[45] June 28, 1977

[54] SURFACE WAVE COMMUNICATION SYSTEM

[75] Inventor: Lester C. Via, Falls Church, Va.

[73] Assignee: Automation Industries, Inc., Silver Spring, Md.

[22] Filed: June 19, 1975

[21] Appl. No.: 588,459

[52] U.S. Cl. ................................. 325/16; 325/129; 333/33

[51] Int. Cl.² ........................ H01B 1/38; H04B 1/04

[58] Field of Search ............. 325/16, 26, 112, 115, 325/119, 128, 129; 333/84, 95 S, 33, 35, 73; 339/14 R, 14 L, 177 R

[56] References Cited

UNITED STATES PATENTS

| | | | |
|---|---|---|---|
| 1,921,117 | 8/1933 | Darbord | 333/35 X |
| 3,241,145 | 3/1966 | Petrides | 325/112 X |
| 3,509,463 | 4/1970 | Watkins et al. | 325/26 |
| 3,518,583 | 6/1970 | Yunoki et al. | 333/73 R |
| 3,777,050 | 12/1973 | Silva | 339/14 R X |
| R23,598 | 12/1952 | Bradley | 333/35 X |

FOREIGN PATENTS OR APPLICATIONS

| 612,407 | 8/1947 | United Kingdom | 333/35 |

*Primary Examiner*—Robert L. Griffin
*Assistant Examiner*—Aristotelis M. Psitos
*Attorney, Agent, or Firm*—Jones, Tullar & Cooper

[57] ABSTRACT

A surface wave communication system is disclosed which provides a communication link between moving objects via a single conductor transmission line. The system includes a wire dispenser for storing and paying out transmission line as needed, and an RF coupling device for initiating and intercepting a surface wave bound to the transmission line.

5 Claims, 3 Drawing Figures

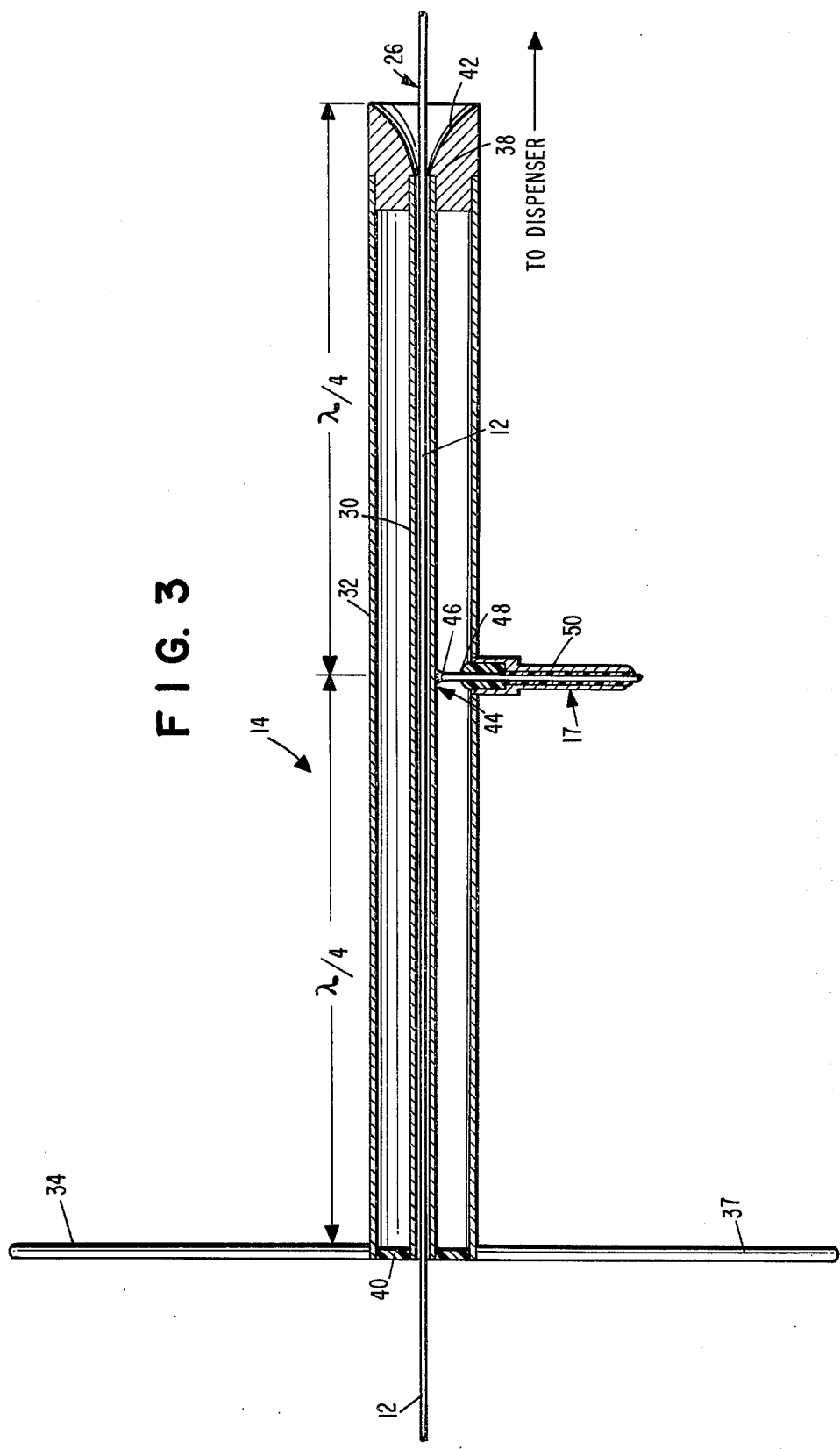

SURFACE WAVE COMMUNICATION SYSTEM

BACKGROUND OF INVENTION

This invention relates in general to an improved surface wave communication system particularly useful in providing communication between moving objects. More specifically, the invention relates to means for coupling radio frequency signals to and from a single wire transmission line to provide a wide bandwidth communications link between relatively moving transmitters and receivers, wherein the signals travel along the transmission line in the form of surface waves.

Surface wave communication systems are generally known in the art and have occasionally been used for limited purposes. Generally, however, when it has been necessary to provide a communication link between two points or objects which are not fixed, other types of communication systems such as radio transmission have been used. An obvious drawback to the conventional radio transmitter and receiver method of communication is the ease with which transmitter information can be monitored or jammed. In addition, radio transmission is dependent upon terrain and atmospheric conditions and often receivers only a short distance away from a transmitter are unable to receive a transmitted radio signal due to blockage of the signal by natural barriers, such as mountains, electrical storms, and other phenomena which can totally obliterate a transmitted radio wave. A type of communication systems which is free of these problems and thus can be relied upon for accurate and dependable transmission of signals has obvious advantages. For these and other reasons, transmission by wire often is a preferred alternative to radio, or wireless, transmission.

Of course, direct wire communication systems such as the conventional telephone system are widely used to provide a private transfer of information, and such systems have many of the advantages alluded to above. However, telephone systems presently available require a direct connection of the transmission line to the transmitter at one end and to the receiver at the other, which inhibits the mobility of this type of system, and makes it unsuitable for communication between relatively moving transmitting and receiving statiions.

Because of the signal attenuation inherent in a transmission line, it is desirable for maximum signal strength and clarity that the length of line between a transmitter and receiver be kept to a minimum. However, this is not generally feasible where the distance between the transmitting and receiving stations varies, and the usual practice is to connect the transmitter and receiver to opposite ends of a connect the transmitter and receiver to opposite ends of a line having a length equal to the maximum distance between the stations, thus producing maximum signal attenuation at all times. Where an excess amount of line is provided, however, the extra length must be stored in some manner, while preserving easy access when the distance between the stations changes, and accordingly the line is usually wound on suitable storage reels. This in itself produces a further problem because the coiling of the transmission line produces a change in line impedance which affects the transmission of signals. A reduction in the length of the line, and thus in signal attenuation, could be obtained if the connection points of the receiver, the transmitter, or both, to the line could be changed as the length of line required to span the distance between the stations changed. However, with conventional couplers, such changes are time consuming and difficult, and thus not suitable for situations where the transmission line length must be changed frequently or where the changes are very rapid.

The present invention overcomes the foregoing problems through the provision of a coupler which is coaxial to the transmission line and through which the line can pass with only a minimum effect on the coupling of signal energy to or from the line.

SUMMARY OF THE INVENTION

It is therefore an object of this invention to provide a transmission system which permits communication between relatively movable stations, and more particularly to provide means for coupling radio frequency signals to a variable length transmission line extending between such stations.

It is a further object of the invention to provide a radio frequency communication system having a transmission line which does not require a direct mechanical connection to a transmitter or receiver, and which therefore may be lengthened or shortened as required to provide communication between relatively movable transmitter and receiver stations.

It is a further object of the invention to provide a wire communication system in which mobility is limited only by the storage capacity of a wire pay-out system.

It is a further object of the invention to provide a communication system wherein reception and transmission of information is restricted to persons possessing a unique coupling device.

It is an additional object of the invention to provide a new and novel means for coupling radio frequency transmitters and receives to a single transmission line in such a way that the line in movable with respect to the coupling means.

Briefly, the foregoing and additional objects are accomplished by a communication system having a single conductor transmission line and a wire dispenser attached to at least one end of the line to pay out the transmission line as needed. A cylindrical surface wave coupler is contiguous to and circumferentially surrounds each end of the transmission line while permitting the line to pass freely therethrough. At the transmitting end, the coupler is driven by a radio frequency source, whereby electromagnetic energy generated by the source is fed through the coupler and thus is coupled to the transmission line in the form of a surface wave. At the receiving end, a second coupler identical to the first intercepts the surface wave travelling along the line and feeds it to a receiver which processes the signal. In this manner, the electromagnetic energy is coupled to the line and processed before the line enters a dispenser at the receiving end. No direct connection of the coupler to the line is required, thus enabling the length of the line to be varied as the distance between transmitter and receiver is varied.

BRIEF DESCRIPTION OF THE DRAWINGS

The foregoing and additional objects, features, and advantages of the present invention will be apparent to those skilled in the art from the following detailed description of a preferred embodiment, taken with the accompanying drawings, in which:

FIG. 3 is a sectional view of the coupling device taken along line 3—3 of FIG. 2.

DESCRIPTION OF THE PREFERRED EMBODIMENT

Figure 1:
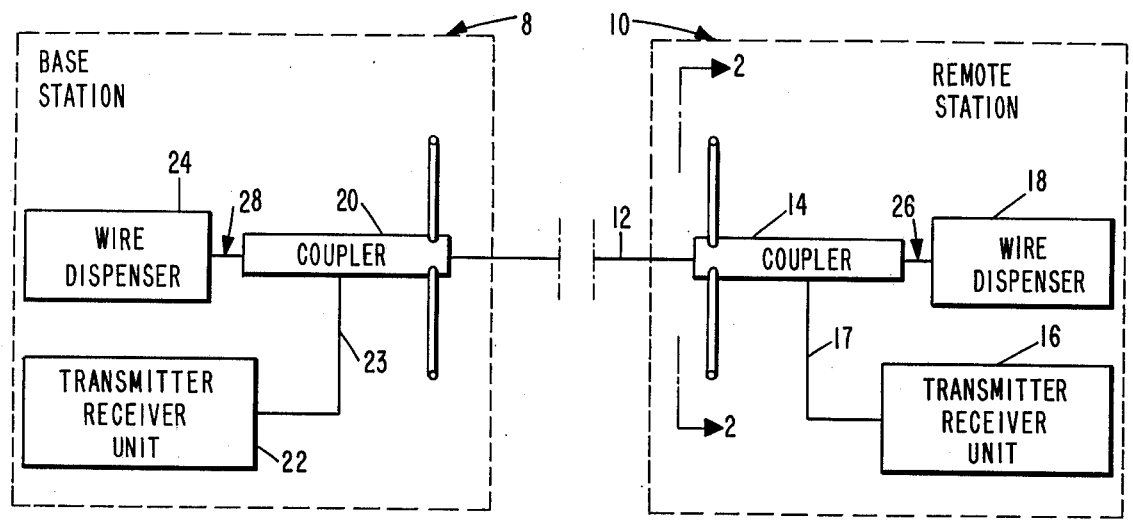
FIG. 1 is a diagrammatic illustration of the surface wave transmission system of the present invention.

Turning now to a more detailed consideration of the invention, reference is now made to FIG. 1, which is a view of the overall system including first and second stations 8 and 10 interconnected by a transmission cable 12. For convenience, the stations 8 and 10 may be referred to as base and remote stations, respectively, but it will be understood that either or both stations may be either mobile or stationary. The transmission cable 12 may take many forms, but essentially is a conventional single wire line which may be either insulated or bare, solid or stranded, as desired. Remote station 10 includes a surface wave coupler 14 and a radio frequency (RF) transmitter-receiver unit 16 of any conventional structure connected to the coupler by way of line 17 for either feeding electromagnetic energy to coupler 14 where it is coupled onto line 12 or for receiving energy from line 12 through coupler 14. A conventional coil or reel dispenser 18 suitable for dispensing wire may be provided in the remote station for paying out or winding up the cable 12 as required.

The base station 8 is similar to the remote station and also includes a surface wave coupler 20 and a radio frequency transmitter-receiver unit 22 of conventional construction connected to the coupler by way of line 23 for feeding energy to transmission line 12 or receiving energy from the line. The base station further may include a suitable wire dispenser and take-up device 24 for paying out and taking up the cable 12. In order to permit changes in the length of cable 12 between stations 8 and 10, one or the other of the stations preferrably is furnished with a wire dispenser; if one station normally is not to be moved, the dispenser would be located at that station, but if both are mobile, a dispenser may be provided at each station.

The transmission cable 12 passes through a central aperture in each of the couplers 14 and 20 so that there is no mechanical interconnection between the couplers and the cable. This allows the cable to be payed out or rewound as desired with little or no effect on the transfer of energy between the cable and the transmitter-receiver units. The coupler, as will be described, provides an efficient and effective termination to the cable 12, so that energy traveling along the cable is not affected by the coils of wire in the dispensers located adjacent, but behind, the couplers. Thus the cable portions 26 and 28 between the couplers and their associated dispensers are relatively free of transmitted wave energy, insuring minimum signal distortion and providing a minimum cable distance over which the signal must travel between stations.

Figure 2:
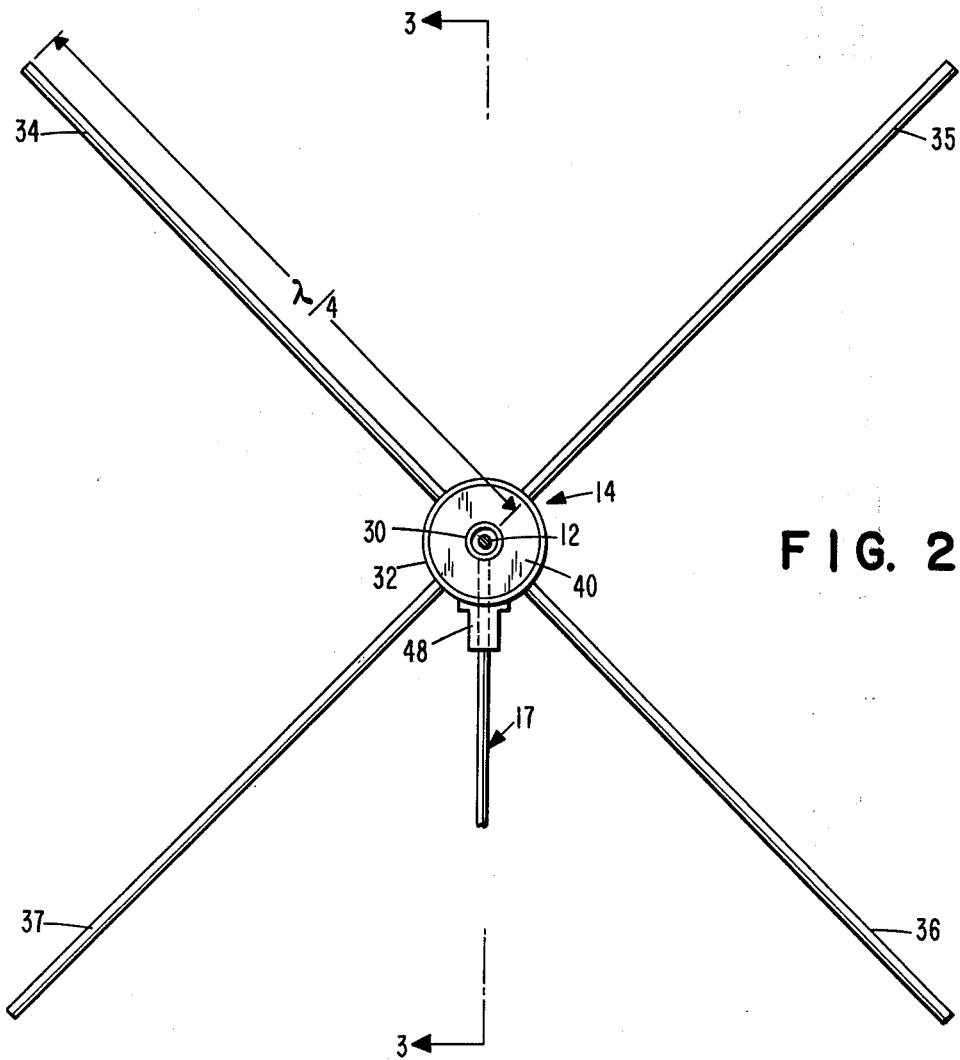
FIG. 2 is an view of a preferred embodiment of the coupling device used in the present system taken along line 2—2 of FIG. 1.

FIGS. 2 and 3 illustrate the structural features of a preferred embodiment of the coupling devices of the present invention. Although the wire dispensers and transmitter-receiver units illustrated in FIG. 1 form important and novel functions within the overall communication system of this invention, the specific structures of these items are conventional and thus they are shown only in block diagram form. Although FIGS. 2 and 3 are views of coupler 14, it will be understood that the coupler 20 is constructed in the same manner as coupler 14 and thus the following discussion is applicable to both. The coupler 14 consists of an electrically conductive inner hollow tubular conductor 30 and an electrically conductive outer concentric hollow conductor or shield 32 which cooperate to form a section of coaxial transmission line. The inner conductor 34 is of sufficiently large diameter to permit the transmission line 12 to pass freely therethrough while also being small enough to be closely contiguous to line 12 so that electromagnetic energy may be transferred between the coupler and the line. Secured at the forward end of the coupler and electrically connected to the outer shield 32 are one or more electrically radial elements which may consist of short sections of adjustable telescoping tubing, such as aluminum. Four radial elements 34–37 are shown in FIG. 2, but the coupler can employ any number of elements including a circular disk which is the equivalent of an infinite number of elements. In the preferred form the radial elements should be extended a distance equal to one quarter of the wavelength of the transmitted frequency, the distance being measured from the center of the innermost tubular conductor 30. However, it has been found that the length of the radial elements can be changed from the preferred length without seriously affecting the system performance and this can be accomplished by extending or retracting the telescoping tubing.

The structure of the coupling device 14 can be more clearly understood from FIG. 3 which is a cross-sectional view of the coupler taken along line 3—3 of FIG. 2. As shown in this Figure, the inner and outer tubular conductors 30 and 32 are positioned concentrically relative to each other by means of circular end spacers 38 and 40. The spacer 38, which is at the end of the coupler closest to the wire dispenser 16, is an electrically conductive support which provides an electrical short circuit between the inner conductor 30 and the outer conductor 32. Spacer 38 has a smoothly curved, funnel-like opening 42 which forms an extension of tube 30 and serves as a fairlead to facilitate passage of the transmission line into and out of the coupler and between the coupler and the dispenser. Spacer 40, which is located at the end of the coupler adjacent the radial elements 34–37, is an electrically insulating support which will not permit current to flow between the inner and outer conductors 30 and 32. This spacer may be shaped to provide a fairlead, if desired, but is shown simply as a spacer disk which maintains the desired spacing between the concentric coupler tubes.

The inner conductor 30 of each coupler is connected at its center point 44 to its corresponding RF transmitter-receiver by way of a coaxial cable. For the coupler 14, the connection is to transmitter-receiver 16 by way of the center conductor 46 of coaxial cable 17, the center conductor passing through the shield 32 and being electrically insulated therefrom by a suitable insulator such as the bushing 48 diagrammatically illustrated in FIG. 3. The outer shield 32 of each coupler is similarly connected at its midpoint to the outer conductor of the coaxial cable; and in the case of coupler 14, the shield is connected to conductor 50 of coaxial cable 17 so that the shield is electrically linked to the RF transmitter-receiver 16.

The coupler in its preferred form has a length equal to one-half the wavelength of the transmitted frequency, and thus the center point is one-fourth wavelength from each of the end supports 38 and 40. The diameter of the outer conductor is relatively large with respect to the diameter of the inner conductor of the coupler, with the ratio of the diameters being selected to provide an impedance match to the transmitter-receiver unit connected to the coupler. The coaxial coupler element thus serves as a matching transformer between the transmission line 12 and its transmitter-receiver unit.

The coaxial conductors 30 and 32 act as a coaxial transmission line which is shorted at one end by spacer 38 and is open at the other end when the surface wave transmission line 12 is not considered. High frequency signals applied to such a coaxial line will flow in a manner that is well known, and the present coupler device functions to connect such high frequency signals as a surface wave between the transmission line 12 and the transmitter-receiver units 16 and 22. It has been found, however, that the provision of radiators such as the radial elements 34–37 at the open end of the line increases the efficiency of the energy transfer between line 12 and the receiver-transmitter units, the coupler 20 thus providing an effective termination to line 12 and substantially eliminating the flow of energy past the coupler and into the wire dispensers. This permits the use of a variable length transmission line, and facilitates communication between relatively moving stations.

In order to understand the operation of the coupler, it is helpful to consider the coupler as being analagous to a coaxially driven quarter wave stub antenna, with the radial elements 34, 35, 36 and 37 forming the ground plane. Whereas in a conventional quarter wave stub antenna the center conductor would continue past the ground plane from the point of feed for a distance of one quarter wave length, in the present case the center conductor 30 terminates at the ground plane, and the transmission line 12 continues past the ground plane indefinitely.

It has been determined experimentally that the transfer of a surface wave bound to a hollow tubular conductor, such as conductor 30, to another conductor which enters the axial opening in the hollow tubular conductor occurs with negligible loss, even if there is not a direct connection between the two conductors. Therefore, at the end of the coupler which carries the dielectric support 40, electromagnetic energy will continue as a surface wave from the center conductor 30 to the transmission line 12 in the transmitting mode of the coupler, and will continue from the transmission line 12 to the center conductor 30 in the receiving mode of the coupler. Thus the energy is transferred through the couplers at each end of the line between the transmission line 12 and the transmitter and receiver units with only negligible losses.

Referring again to the overall communication system of FIG. 1, it will be seen that each of the stations 8 and 10, consisting of couplers, dispensers and transmitter-receiver units, may be portable, and thus may be mounted on a movable object located at their respective stations. As the stations 8 and 10 move relative to each other, the corresponding wire dispensers 24 and 18 pay out or take up the wire through the couplers 20 and 14 as needed. When informaion is to be sent from one station to another, e.g. from station 10 to station 8, a radio frequency signal carrying the information is generated by unit 16 and fed via line 17 to coupler 14. The coupler 14 receives the RF energy representing the information and converts it to a surface wave on the interconnecting transmission line 12, where it travels to station 8. At the receiving end of the line, the surface wave is intercepted by coupler 20 and is transferred in the form of a received RF signal by way of line 23 to the receiver in unit 22, where the information is processed.

In confirming the operation of the system as described above, a pair of experimental stations were constructed, using the couplers as described hereinable with a variety of transmission lines interconnecting them. The system was operated using signals at a frequency of 400 MHz, this frequency being selected to keep the dimensions relatively small, and to avoid interference from stray signals. The couplers used were constructed with the ratio of the inside diameter of the shield to the outside diameter of the center conductor being:

$$\frac{1.200 \text{ inch}}{.125 \text{ inch}} \text{ or } 9.60$$

which forms a coaxial line with the impedance $$Z_o = 60 \log_e 9.60 = 132 \text{ ohms}$$

which would match a 50 ohm line to a load of $$Z_o = \frac{132^2}{50} = 348 \text{ ohms}$$

This impedance is in the area that would be expected for transmission lines of the types of wire commonly used which are readily obtainable.

The radial elements 34–37 were fabricated from short sections of telescoping tubing to allow observation of the effect of the length of the radial elements on system performance. Telescoping tubing was also used to change the outside diameter of the tubular center conductor 30 by sliding a section of the next larger size tubing over the existing tubular center conductor. Both couplers were constructed to allow mounting to standard photographic tripods.

The substitution method was used to make measurements of the input impedance of the coupler. This consists of placing a precision 50Ω load on a precision 50Ω source, measuring the voltage across the 50Ω load, then replacing the 50Ω load with the coupler and measuring the voltage developed across the coupler. This method has the disadvantge of requiring the impedance angle to be known to enable the impedance to be determined accurately, but subsequent tesing showed the impedance to be resistive with little reactive component. Table 1 shows the results of impedance measurements made using various types of wire for the transmission line 12. The transmission line 12 was terminated using a second coupler with a 50Ω load placed on the coaxial connector at the midpoint of the coupler to simulate the loading effect of a transmitter-receiver unit. The distance between the transmitting and receiving couplers was adjusted for minimum and maximum voltmeter indications to allow V.S.W.R. corrections to be made.

Table 1

| Wire Size | Type | Insulation | Impedance Coupler Terminal | Line |
|---|---|---|---|---|
| No. 20 | Stranded, Silver Plated | 16 mil Teflon | 59.6Ω | 292Ω |
| No. 18 | Stranded, Tin Plated | 12 mil PVC | 59.3Ω | 294Ω |
| No. 22 | Stranded, Tin Plated | 11 mil PVC | 59.0Ω | 295Ω |
| No. 22 | Solid, Tin Plated | None | 57.8Ω | 302Ω |
| No. 26 | Solid, Tin Plated | None | 55.8Ω | 312Ω |

Table 1-continued

| Wire Size | Type | Insulation | Impedance Coupler Terminal | Line |
|---|---|---|---|---|
| .0015" dia. | Solid Nichrome (1000Ω per meter) | None | 45.2Ω | 286Ω |
| No. 14 | Solid Magnet Wire | Formvar | 66.6Ω | 264Ω |

Increasing the diameter of the tubular center conductor to 5/32 inches or 0.156 inches from the initial size of 0.125 inches decreased the input impedance of the coupler with the No. 20 Teflon wire from 59.6 to 54.7. The next larger size, 3/16 inches or 0.187 inches, was not available but probably would be very close to 50Ω with the Teflon wire. Results of the impedance measurements indicated impedances lower than expected but otherwise nothing unusual was observed.

Initial attenuation measurements were made by observing the decrease in output power from the receiving coupler as it was moved away from the transmitting coupler. The distance was changed from 30 in. to 35 ft. Table 2 shows the results of these measurements.

Table 2

| Wire Size | Type | Insulation at 400 MHz | | Attenuation* | |
|---|---|---|---|---|---|
| No. 20 | Stranded, Silver Plated | 16 mil Teflon | | 6 | db per 100 ft. |
| No. 20 | Solid, Tin Plated | None | | 6 | " |
| No. 18 | Stranded, Tin Plated | 11 mil PVC | | 4.5 | " |
| No. 24 | Solid, Copper | 11 mil polyethylene 5 mil nylon jacket | | 3 | " |
| No. 24 | Solid, Copper | Insulation removed | | 7.5 | " |
| No. 17 | Solid, Magnet | Heavy Formvar | | 6.6 | " |
| No. 30 | Solid, Magnet | 5 mil Cotton | | 7.5 | " |
| No. 36 | Solid, Magnet | Enamel | | 9 | " |

*Attenuation per 100 ft. is the 35 ft. loss measurement minus the 30 in. loss measurement multiplied by 3.

Results of attenuation measurements were quite unexpected. No. 20 tin plated bus wire had as low an attenuation factor as did silver plated, teflon insulated hook-up wire. No. 24 poly-nylon insulated copper wire exhibited the lowest attenuation of any wire tested, but if the insulation was removed the attenuation increased by only 4.5 db per 100 ft.

Some of the attenuation measurements were repeated while carefully checking for sources of measurement error. Substantially the same results were obtained. A quarter wave section of insulation, consisting of 11 mils of polyethylene covered with a 5 mil nylon jacket, was removed from the wire. The total line attenuation was the same as with continuous insulation, indicating no significant change in line impedance. The couplers each introduce a loss of approximately 1 db. The total system attenuation then is 2 db plus the transmission line attenuation. The polyethylene-nylon insulated wire appeared to be the most promising, so a 150 ft. section was set up to allow more accurate attenuation measurements. The 150 ft. line appeared to have 2.33 db per 100 ft.

Bandwidth measurements were made with the couplers separated by 150 ft. of No. 24 poly-nylon insulated wire. There was less than 2 db variation in the output of the receiving coupler with a constant input power to the transmitting coupler as the frequency was changed from 300 MHz to 450 MHz. The results of the bandwidth measurements indicate a sufficient bandwidth for any conceivable application, such as high resolution video information.

Radiation of energy from the couplers itself may not be seriously objectionable for many applications but the reciprocal function, that is, the susceptibility of the coupler and transmission line to interference from external fields, is of concern if reliable communication is to be obtained. Accordingly, measurements were made of the external field caused by power on the transmission line, or power at the coupler output due to external fields. Actual measurement of the field near the line proved difficult, expecially near the couplers, for the position of nearby objects and the exact location of the actual point of measurement near the couplers caused very large changes in field measurements.

Field measurements were made using a quarter wave stub with ground plane feeding a Hewlett Packard 420A dectector. The output of the detector was monitored with a General Radio 1232A tuned null detector. The null detector was tuned to 1 KHz. Two watts of power were delivered to the transmitting coupler (400 MHz with 1 kHz 50% modulation). The receiving coupler was separated from the transmitting coupler by 150 ft. of No 24 poly-nylon insulated wire. The field intensity 7 ft. from the center of the line caused a −20 dbm signal at the stub antenna output. The field increased 6 db if the load was removed from the receiving coupler. All that can be said of the field near the receiving coupler is that the radiated output could be picked up at −20 dbm 18 ft. from the line.

During the tests with a 150 ft. section of No. 24 poly-nylon insulated wire, an in-line power meter was placed between the signal source and the transmitting coupler. The signal source delivered 6 watts maximum power to the coupler, and the reflected power was 0.5 watts.

It was found that when acting as a receiver, the coupler does not intercept 100 percent of the surface wave, but some power will pass by the coupler and continue down the transmission line to the wire dispenser. If a second coupler is placed in series with the first coupler, further interception of the traveling wave occurs, with the output of the second coupler being 18 db below the output of the first receiving coupler. However, in practice, the maximum distance over which transmission of this type can be reliably established is primarily a function of the quality of the transmission line and improving the coupler to 100 percent efficiency does not increase the maximum range significantly. As an example, using No. 24 insulated wire as the transmission line, the maximum distance over which reliable communication could be established at 400 MHz would be little less than 1¼ miles, if the transmitted power was 10 watts, with a receiver sensitivity of −110 dbm. Increasing the transmitted power to 100 watts would only provide an additional 431 feet in range. If one or more repeaters could be used the range can be extended in some applications.

Thus there has been described a novel and effective system for providing surface wave communication over a single wire transmission line between two stations which are movable with respect to each other. Although the invention has been shown and described in terms of a single preferred embodiment, variations and modifications will be apparent to those skilled in the art. It is, therefore, intended that the invention not be limited to the disclosed embodiment, the true spirit and scope thereof being set forth in the following claims.

I claim:

1. In a surface wave communication system, a length of transmission line for carrying electromagnetic eneergy in the form of surface waves between two communication stations, at least one of which has a, dispenser means for paying out and taking up said transmission line, and means for transmitting and receiving electromagnetic signal energy, the improvement comprising:

coupler means having a first end and a second end and including an inner, substantially cylindrical conductor and an outer, substantially cylinder conductor, said inner and outer conductors being coaxial and substantially coextensive;

wave open circuit and wave short circuit support means located at said first and second ends, respectively, of said coupler means mounting said inner conductor coaxially on said outer conductor and allowing electromagnetic wave energy to pass through substantially only said first end of fsaid coupler means;

means including a central aperture extending axially through said inner conductor for slidably mounting said coupler means on said transmission line, said inner conductor being contiguous to and circumferentially surrounding said transmission line to allow said transmission line to pass freely therethrough, whereby the dispenser means can pay out or take up said transmission line through said coupling means; and coaxial conductor means electrically connecting said transmitting and receiving means to the midpoint of said coupler means whereby said signal energy is coupled between said transmission line and said transmitting and receiving means by way of said first end of said coupler means.

2. The surface wave communication system of claim 1 wherein said wave short circuit support means is an electrically conductive spacer which conducts said signal energy between said inner and outer conductors.

3. The surface wave communication system of claim 2, wherein said wave open circuit support means is an electrically insulating spacer which insulates said signal energy traveling on either of said inner or outer conductors from the other.

4. The surface wave communication system of claim 1 wherein said coupler means further includes at least one radial element connected to said outer conductor at said second end of said coupler means to provide a ground plane to the signal energy traveling on said outer conductor.

5. A coupler device for coupling wave energy between a transmission line conductor and a transmitting and receiving station, said coupler comprising:

an inner cylindrical conductor having a central aperture of slightly larger diameter than the diameter of the transmission line conductor;

an electrically nonconductive support means mounted at a first end of said inner conductor;

an electrically conductive short circuiting support means mounted at a second end of said inner conductor;

an outer cylindrical conductor coextensive with and mounted concentrically on the said inner conductor, said outer conductor being supported at its first and second ends by said electrically nonconductive and said electrically conductive short circuit support means, respectively;

at least one radial element connected to said first end of said outer conductor to provide a ground plane for said outer conductor;

transmitter-receiver means at said station for transmitting and receiving signal energy; and conductor means for conducting signal energy between said transmitter-receiver means and said coupling device.

* * * * *

UNITED STATES PATENT AND TRADEMARK OFFICE
CERTIFICATE OF CORRECTION

PATENT NO. : 4,032,845
DATED : June 28, 1977
INVENTOR(S) : Lester C. Via

It is certified that error appears in the above-identified patent and that said Letters Patent are hereby corrected as shown below:

Claim 1, line 3, "eneergy" should be --energy--.

Claim 1, line 4, "a," should be --a--.

Claim 1, line 19, "fsaid" should be --said--.

Claim 5, line 16, "circuit" should be --circuiting--.

Col. 7, Table 2, the Headings should read as follows:

| Wire Size | Type | Insulation | Attenuation* at 400 MHz |
| --- | --- | --- | --- |

Signed and Sealed this

Thirteenth Day of September 1977

[SEAL]

Attest:

RUTH C. MASON
Attesting Officer

LUTRELLE F. PARKER
Acting Commissioner of Patents and Trademarks